United States Patent [19]

Jannusch

[11] 4,440,884

[45] Apr. 3, 1984

[54] CAUSTIC SENSITIVE, WATER RESISTANT LABELING ADHESIVE

[75] Inventor: Leonard C. Jannusch, New Brighton, Minn.

[73] Assignee: H. B. Fuller Company, St. Paul, Minn.

[21] Appl. No.: 435,356

[22] Filed: Oct. 20, 1982

[51] Int. Cl.³ ............................ C08L 3/00; C09J 3/06; C09J 3/24; B32B 9/02

[52] U.S. Cl. ........................................ 524/26; 524/25; 524/47; 524/49; 524/52; 524/211; 524/212; 524/441; 106/146; 106/148; 106/213; 106/214; 156/328; 156/336; 428/356

[58] Field of Search ............... 524/25, 26, 47, 48, 524/49, 52, 55, 211, 212, 441; 106/213, 214, 146, 148, 193 M; 156/328, 336; 428/356

[56] References Cited

U.S. PATENT DOCUMENTS

| | | | |
|---|---|---|---|
| 2,368,767 | 2/1945 | Moore | 524/52 |
| 3,857,803 | 12/1974 | Shenfeld | 524/52 |
| 3,872,051 | 3/1975 | Tiedeman et al. | 524/441 |
| 3,939,108 | 2/1976 | Sirota et al. | 524/52 |
| 4,135,033 | 1/1979 | Lawton | 428/344 |
| 4,248,917 | 2/1981 | Hornibrook et al. | 428/356 |

OTHER PUBLICATIONS

Industrial and Engineering Chemistry, vol. 37, No. 8, Aug. 1945, pp. 736–741.
Chemical Engineering, Dec. 1954, pp. 230, 232–233.
Journal of Coatings Technology, vol. 54, No. 691, Aug. 1982, pp. 47–53.

*Primary Examiner*—John Kight, III
*Assistant Examiner*—Nathan M. Nutter
*Attorney, Agent, or Firm*—Merchant, Gould, Smith, Edell, Welter & Schmidt

[57] ABSTRACT

An aqueous adhesive, resistant to humidity and water, which debonds in the presence of strong base, comprises finely divided aluminum, a natural product bonding agent and water.

37 Claims, No Drawings

CAUSTIC SENSITIVE, WATER RESISTANT LABELING ADHESIVE

This invention relates to an improved labeling adhesive which maintains a strong bond between the label and the object to which it is attached in ordinary environments including immersion in water, but when contacted with strong base (a source of $OH^-$) it readily softens and debonds, permitting rapid label removal.

BACKGROUND OF THE INVENTION

For many years labels have been bonded to containers or other objects using adhesive systems comprising aqueous solutions or suspensions of natural product binders (bonding agents) such as starches, dextrins, gums, proteins, casein and casein derivatives. These adhesive systems maintained an adequate bond if kept dry. However, labels bonded with many water-based adhesive systems could be removed by substantial humidity or immersion in water. One class of common label adhesives are the "jelly gum" adhesives. Jelly gum adhesives commonly comprise starch, urea, and a strong base such as sodium or potassium hydroxide. Optionally jelly gum adhesives can contain hydrophilic fortifying polymers in order to improve machinability, bond strength, bonding time and cost. Fortified "jelly gum" adhesive systems are taught in U.S. Pat. Ser. No. 3,857,803. These adhesives provide strong, quick adhesion between the label and the object or container, and provide adequate resistance to debonding when exposed to humidity or water, but can cause problems if the label must be quickly and easily removed from the bottle.

Labels bonded to returnable bottles using fortified jelly gum adhesives are not easily removed by water. More severed conditions such as steam or strong base (a source of aqueous $OH^-$) are commonly used. The fortified jelly gums when exposed to caustic can be resistant to debonding since the caustic can gel the starch, reducing its water solubility. This problem can be severe in breweries where substantial quantities of bottles are returned for cleaning and refilling. Bottles having labels which are hard to remove must be often handcleaned, substantially increasing the expense of returning the refilled bottle to the marketplace.

A second class of common label adhesives comprises casein based aqueous adhesive systems. Casein and its derivatives have been used since it forms strong bonds, is humidity and water resistant, and can debond in the presence of strong base. However, in recent years casein has become more expensive.

Clearly a substantial need has arisen for a new adhesive which can be a substituent for casein and which can provide strong bonds, can be easily machined, can be resistant to humidity and water, but can quickly debond when exposed to strong base (hydroxyl, $OH^-$).

BRIEF DISCUSSION OF THE INVENTION

We have found that an aqueous adhesive composition comprising a dispersion of a natural product bonding agent such as a gum, starch, protein, casein or its derivatives and an effective amount of an active metal which reacts with strong base causing rapid debonding, is a highly effective labeling adhesive. One aspect of the invention comprises the novel, active metal containing adhesive composition. Another aspect of the invention comprises a method for applying a label to a container using the novel active metal containing adhesive composition of this invention. Still another aspect of this invention is a method for the preparation of the novel active metal containing adhesive composition.

DETAILED DISCUSSION OF THE INVENTION

The adhesive composition of this invention comprises a natural product bonding agent and a finely divided active metal which is substantially stable to chemical reaction in a substantially neutral aqueous adhesive system, but which actively reacts with strong base generating heat and bubbles resulting in the rapid debonding of the label.

ACTIVE METALS

Essentially any metal that will generate heat and/or displace hydrogen or other gas from a strongly basic solution can be used in the novel adhesive composition of this invention.

Useful active metals are those which will not rapidly react with aqueous adhesive compositions, thus being consumed before the adhesive is applied. Metals such as lithium, potassium and sodium are substantially electropositive, are too active in aqueous media, and can be dangerous to handle during the manufacture of the adhesive. Metals such as bismuth, copper, mercury, silver and gold are substantially inactive and cannot react to generate heat or to displace hydrogen or any other gas from strong base.

Metals having an intermediate activity between sodium and copper are most useful in the adhesives of the invention. A preferred metal for the novel adhesive compositions of this invention is aluminum which has such a balance of properties. Aluminum displaces hydrogen from water or other neutral solutions at such a slow rate that the aluminum containing adhesives have a substantial useful shelf life.

The following reaction sequence occurs when the aluminum containing adhesive comes into contact with caustic:

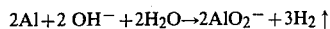

Other active metals that can be used beneficially in the invention include cerium, neodymium, zirconium, tungsten, and manganese.

The active metal used in the novel adhesive compositions of this invention is present in a substantially finely divided state. Sufficient surface area of the metal must be available for reaction with base to generate sufficient amounts of bubbles and heat, resulting in the debonding of the label from the bottle. Such surface area is provided by metal in powder, flake, chip or other particulate form. The preferred form for the metal in the novel adhesive compositions of the invention is a finely divided atomized particle having a size of less than about 1,000 microns, preferably about 100 to 0.1 microns, and most preferably for reasons of ease of handling, availability and high reactivity with base, about 25 to 0.1 microns.

One source of the preferred atomized aluminum powders is the Alcan Aluminum Corporation which supplies a variety of grades of flake and powdered aluminum.

BONDING AGENTS

The adhesives of this invention are commonly aqueous based, and are formed by dissolving or suspending a bonding agent (binder) in water. After the adhesive is in place between a label and an object and water has been removed, the bonding agent provides the adhesive bond. Common bonding agents in aqueous systems include naturally occurring materials such as starches, dextrins, gums, proteins (both animal and vegetable), casein, shellac, natural rubber and others. Preferred bonding agents are starches and casein for reasons of availability and ease of application.

Starches useful in this invention include well-known starches which have been used in the past in adhesive formulation. Starches are generally derived from plant sources and comprise polysaccharide polymers. The polysaccharides can be branched or substantially straight chain polymers. Prefered starches are highly branched at the 2, 3 or 6 position of the saccharide monomer. Preferred starches for use in this invention are waxy maize starches. For reasons of availability, high adhesion, and contributions to resistance to moisture, A.E. STALEY WAXY MAIZE starches 640 and 644, are preferred.

Casein is the principal protein of milk and it and its derivatives can be used in the adhesive compositions of this invention. Exact conditions for manufacturing casein varies somewhat with the type of product desired. However, commonly skim milk is warmed and mixed with acid. Casein precipitates and is separated from the whey or wash water. Casein can be converted to alkali metal caseinates by mixing casein with appropriate metal bases such as calcium, sodium or potassium hydroxide. Casein hydrolyzates are made by contacting a neutralized casein solution with proteolytic enzymes, resulting in the hydrolysis of the casein protein.

FORTIFYING POLYMERS

The aqueous based adhesives of this invention can contain a natural product bonding agent in combination with a synthetic fortifying polymers which can provide additional properties to the adhesive.

Synthetic hydrophilic fortifying polymer compositions useful in the water based adhesive of this invention include urea-formaldehyde (aminoplasts), phenol-formaldehyde (phenoplasts), polyvinyl acetate polymers, styrene maleic anhydride polymers, polyvinyl alkyl ethers, acrylate and methacrylate polymers, etc. Preferred polymeric compositions for use in this invention are styrene-maleic anhydride copolymers and acrylate polymers made up of alkyl acrylates, alkyl methacrylates, acrylic acid, acrylamide, and other related monomers. These materials increase the bond strength and provide a quick bond.

Preferably, the synthetic polymeric materials are provided in the form of an aqueous emulsion, which can be easily blended into the aqueous adhesives of this invention. Commercial acrylic emulsion polymers available on the market that can perform exceptionally well for reasons of easy application, superior adhesion, and stability are the Rhoplex TM series (Rohm and Haas) and the Lytron TM series (Monsanto) of polymer emulsions.

NITROGENEOUS SUBSTANCES

The novel adhesive composition of the invention can also contain nitrogenous substances such as urea, urea compounds, and dicyandiamide and mixtures thereof. These nitrogenous compounds are added to the adhesive composition to improve machinability, to control viscosity and to affect the strength of the bond. Other components that can be used in the adhesive composition of this invention are anti-foam agents and preservatives commonly used in biodegradable natural product containing compositions.

Optionally, when a hydrophilic polymeric composition is used having substituent groups which can be hydrolyzed to increase their hydrophilicity, the hydrolyzable groups can be reacted with a base. Preferably, ammonia in the form of a solution of ammonium hydroxide or as gas is added directly to the adhesive composition. Ammonia has an advantage that it can hydrolyze polymeric substituent groups but will not react with aluminum to form hydrogen.

In somewhat greater detail, the novel adhesive compositions of this invention are made by suspending or dissolving each of the components in water.

The adhesive composition of this invention need only contain sufficient aluminum or active metal to react with strong base, generate hydrogen bubbles and heat in order to effectively debond labels. We have found that an effective debonding amount of aluminum powder comprises from about 0.1 to 15 wt-%, preferably about 0.25 to 5 wt-%, most preferably for reasons of economy, low viscosity and ease of handling, about 1 to 3 wt-% aluminum based on the aqueous adhesive composition.

Water based adhesive compositions preferably contain a maximum amount of solids and a minimum amount of water which must be removed to leave the bonding agent in place. The adhesives of this invention have been prepared with less than 75% water. And for reasons of low viscosity and ease of application, the novel adhesive compositions of this invention can comprise about 35 to 60 wt-% water based on the aqueous adhesive composition.

The adhesive can contain from about 10 to 60 wt-% of starch, casein or derivatives thereof or other natural product bonding agent, preferably about 10 to 50 wt-% bonding agent, most preferably about 25 to 45 wt-% bonding agent, exclusive of any fortifying polymer, based on the aqueous adhesive composition.

The hydrophilic polymeric compound can be present in a sufficient amount to increase bond strength and rate of bond formation, amounts of about 1.0 to 40 wt-%, preferably about 2.0 to 35 wt-%, most preferably about 2.5 to 35 wt-% based on the aqueous adhesive composition.

Nitrogenous compounds such as urea or dicyanamide can be present in amounts sufficient to improve machinability, control viscosity, and affect bond strength comprising about 0.1 to 20 wt-% based on the aqueous adhesive composition.

Sufficient ammonia gas ($NH_3$) or ammonium hydroxide ($NH_4OH$) can be used to hydrolyze hydrophobic substituent groups on a fortifying polymer. Ammonia can be added at a rate of about 0.1–5 moles of ammonia per each mole of hydrolyzable hydrophilic substituent such as the dicarboxylic moiety of maleic anhydride residue in the polymer. While ammonia and ammonium hydroxide are strong bases they do not corrode or react with aluminum.

Anti-foam agents and bacteria inhibitors are generally used at conventional concentrations of 4 wt-% or less, preferably 1 wt-% or less.

The following working Examples are illustrative of the invention and contain a best mode.

EXAMPLE I

Into a double boiler was placed 47.10 grams of water, 31.10 grams of a highly branched starch (STALEY WAXY MAIZE STARCH 644) and 2 grams of a highly branched starch (STALEY WAXY MAIZE STARCH 640). The mixture was stirred until a uniform starch dispersion was formed. To the starch dispersion, at ambient temperatures, was added 0.25 grams of a conventional defoamer (NOPCO VF Diamond Shamrock), 3.0 grams of aluminum flakes (MD-2100 Alcan Aluminum Corporation) having an average particle size of about 50 microns, 6.70 grams of urea, 2.80 grams of dicyandiamide and 4.40 grams of a styrene-maleic anhydride copolymer (LYTRON-822 MONSANTO) having an average molecular weight of about 20,000. The mixture was stirred until homogenous and 1.90 grams of 29.4 wt-% (26° Be) ammonium hydroxide was added. The mixture was stirred and heated to 85° C. and maintained at 85° C. with stirring for 20 minutes in order to solubilize the starch and to insure the reaction between ammonium hydroxide and the styrene maleic anhydride copolymer. After reaction was complete, the mixture was cooled to 40° C. and an additional 0.5 grams of NOPCO VF defoamer and 0.25 grams of 2,2'-methylene-bis-(4-chlorophenol), a preservative, was added. The resultant product had a pH of 9.5, and a viscosity of 48,000 cP at 30° C. measured with spindle no. 7 on a Brookfield RVF viscometer at 20 r.p.m.

EXAMPLE II

Example I was repeated except that 2.0 grams of an atomized aluminum powder (MD-101 Alcan Aluminum Corporation) having an average particle size of 16 microns were substituted for the aluminum flakes. The resulting adhesive had a viscosity of 45,000 cP and a pH at 85° F. of 9.24.

EXAMPLE III

Into a double boiler was placed 36.64 grams of water and 1.55 grams of a highly branched starch (STALEY WAXY MAIZE STARCH 640), and 24.20 grams of a highly branched starch (STALEY WAXY MAIZE STARCH 644). The mixture was stirred until a uniform starch dispersion formed. To the starch dispersion, at ambient temperature, was added 0.25 grams of NOPCO VF defoaming agent, 4.21 grams of a styrenemaleic anhydride copolymer (LYTRON-822 MONSANTO) having average molecular weight of about 20,000, 5.22 grams of urea, 2.18 grams of dicyandiamide, 21.0 grams of an emulsion of an acrylic polymer (Rhoplex LC-40, Rohm and Haas, having about 55 wt-% solids, a viscosity at 25° C. of less than about 300 cP measured on a Brookfield LVT viscometer using spindle no. 2 at 60° r.p.m.), and 2 grams of an atomized aluminum powder (MD-101 Alcan Aluminum Corporation) having an average particle size of about 16 microns. The mixture was stirred until homogeneous and 1.94 grams of (26° Be) 29.4 wt-% ammonium hydroxide was added. The mixture was stirred and heated to 85° C. and maintained at that temperature with stirring for 20 minutes to solubilize the starch and to insure the reaction between ammonium hydroxide and the styrene maleic anhydride copolymer. After the reaction was complete, the mixture was cooled to 40° C. and an additional 0.5 grams of NOPCO VF defoamer and 0.25 parts of 2,2'-methylene-bis-(4-chlorophenol) were added. The resulting adhesive had a viscosity of 67,000 cP and a pH of 9.4.

EXAMPLE IV

Example II was repeated except that 3 grams of the atomized aluminum powder (MD-101) having an average particle size of about 16 microns was used in place of the 2 grams of aluminum powder. The viscosity was 48,000 CP and the pH was 9.5.

EXAMPLE V

Example II was repeated except that 4 grams of the atomized aluminum powder (MD-101) having an average particle size of about 16 microns was used in place of the 2 grams of aluminum powder. The viscosity was 49,000 cP and the pH was 9.5.

EXAMPLE VI

Example II was repeated except that 5 grams of the atomized aluminum powder (MD-101) having an average particle size of about 16 microns was used in place of the 2 grams of aluminum powder. The viscosity was 64,000 cP and the pH was 9.6.

EXAMPLE VII

Example IV of U.S. Pat. Ser. No. 3,857,803 was substantially repeated by combining 58 grams of water, 10 grams of a highly branched starch (STALEY WAXY MAIZE STARCH 640) and 15 grams of a highly branched starch (STALEY WAXY MAIZE STARCH 644) in a smooth dispersion. Into this dispersion was added 10.0 grams of urea, 0.5 grams of wheat flour, and 3.9 grams of a styrene maleic anhydride copolymer having an average molecular weight of about 20,000 (Lytron 822 Monsanto). The dispersion was mixed well and 2.0 grams of 29.4 wt-% (26° BE) ammonium hydroxide was added to the mixture with 0.5 grams of a defoaming agent Colloid 675 (Colloids Inc.). The mixture was stirred and heated to a temperature of about 85° C. and maintained at that temperature for 15 minutes to solubilize the starch and to insure reaction between ammonia and the styrene-maleic anhydride polymer. The mixture was cooled to 60° C. and 0.1 grams of 2,2-methylene-bis(4-chlorophenol was added). The adhesive had a viscosity of 20,000 cP and a pH of 9.6.

EXAMPLE VIII

Example VII was repeated except that 3.0 grams of an atomized aluminum powder (MD-101) having an average particle size of about 16 microns was added. The resulting adhesive had a viscosity of 25,000 cP and a pH of 9.6.

EXAMPLE IX

Example II was repeated except that 1.0 grams of an atomized aluminum powder (MD-101) having an average particle size of about 15 microns was substituted for the 2 grams of the atomized aluminum powder having an average particle size of about 16 microns. The viscosity was 45,000 cP and the pH was 9.2.

EXAMPLE X

Example II was repeated except that 0.5 grams of an aluminum powder (MD-101) having an average particle size of about 15 microns was substituted for the 2.0 grams of aluminum powder. The viscosity was 45,000 cP and the pH was 9.2.

EXAMPLE XI

Example II was repeated except that 0.25 grams of an atomized aluminum powder (MD-101) having an average particle size of about 15 microns was substituted for the 2 grams of aluminum powder. The viscosity was 45,000 cP and the pH was 9.2.

EXAMPLE XII

Example II was repeated except that 0.1 grams of an atomized aluminum powder (MD-101) was substituted for the 2 grams of aluminum powder. The viscosity was 45,000 cP and the pH was 9.2.

EXAMPLE XIII

Example VII was repeated except that the aluminum powder was omitted. The viscosity was 45,000 cP and the pH was 9.2.

The adhesives prepared in Examples I through XIII were used to apply paper labels and inked, foil coated paper labels to returnable beverage bottles. Adhesive was applied to the labels using a stirring rod wrapped with a No. 24 wire to simulate the amount of adhesive applied to labels using automatic labelling machines found in high volume bottling installations. The labels and wet adhesive were attached to glass bottles and dried at 48° C. (110° F.) for 24 hours. The bottles and attached labels were tested for speed of debonding of the labels by immersing the bottles in 4% sodium hydroxide solution maintained at 70° C. (158° F.). The results of the debonding experiment are shown in Table I.

TABLE I

| CAUSTIC DEBONDING | | | |
|---|---|---|---|
| Adhesive of Example | Amount of Aluminum (% wt) | Type of Aluminum | Time to Debond (Min.) |
| I | 2.0 | Flake | 10–15 |
| II | 2.0 | Powder | 3¼–4 |
| III | 2.0 | Powder | 2¾–3½ |
| IV | 3.0 | Powder | 3 |
| V | 4.0 | Powder | 2¼–4 |
| VI | 5. | Powder | 3¼–3¾ |
| VII | None | — | 30 |
| VIII | 3.0 | Powder | 5–6 |
| IX | 1.0 | Powder | 6–8 |
| X | 0.5 | Powder | 6–8 |
| XI | 0.25 | Powder | 9–11 |
| XII | 0.1 | Powder | 12–18 |
| XIII | None | — | 18–24 | an examination of the data in Table II shows that adhesive systems used to glue labels on beverage bottles in the absence of aluminum in one case took 18 to 24 minutes for the label to debond, and 30 minutes for the label to debond. Aluminum present in the label adhesive resulted in a substantially more rapid debonding action. As little as 2¾ minutes resulted in the substantial debonding of an adhesive containing 2% aluminum. As little as 0.1 wt-% aluminum in the adhesive resulted in debonding in 12 minutes. Clearly, the presence of aluminum in the adhesive sharply accelerates debonding action. Further, it appears powdered aluminum is more effective than flake.

A set of inked, foil-coated paper labels coated with the adhesive of Example IV were attached to beverage bottles. The bottles were dried, insuring removal of moisture from the adhesive. Once dry the bottles were immersed in 4% sodium hydroxide solution at temperatures of 24° C. (75° F.), 38° C. (100° F.), 49° C. (120° F.), 60° C. (140° F.), 71° C. (160° F.), 80° C. (180° F.). The time for removal of the ink from the foil, the time for the removal of the foil, and the time for total debonding of the label were recorded and are presented in Table II.

TABLE II

| LABEL DEBONDING AT VARIOUS TEMPERATURES | | | |
|---|---|---|---|
| Temperature °C. | Minutes | | |
| | Ink removed | Foil Removed | Label Debond |
| 24 | 6 | * | * |
| 38 | 1.5 | 25 | 30 |
| 49 | 0.33 | 11 | 24–27 |
| 60 | 0.17 | 5 | 10–12 |
| 71 | 0.17 | 3 | 5.5–6.5 |
| 80 | 0.08 | 1.5 | 3 |

*Not removed

The above data clearly shows that even hard to remove foil coated paper labels are removed rapidly by hot caustic at elevated temperatures.

A third set of labels coated with the adhesive of Examples I and II were applied to beverage bottles, were dried at room temperature for 7 days, and were immersed in tap water at 4.5° C. (40° F.) for 4 days. While the paper of certain labels softened depending on their composition, the labels remained fixed and securely bonded to the bottles.

Containers which can be labelled using the adhesives of this invention include bottles made from materials that are substantially resistant to strong base. Such bottles materials include glass, plastic such as polyethylene, polypropylene, polystyrene, polyethylene terephthalate, etc.

Labels can be made from a variety of thin webs of materials such as paper, plastics, foil, or any other thin material which can support legends identifying the product or bearing instructions for use. Preferred materials are paper, plastic such as polystyrene, metallic foil such as aluminum, etc.; and composite labels made from paper, plastic, foil or other combinations. The labels can be imprinted with legends using common commercial inks.

The foregoing discussion, Examples and data are illustrative of the invention. However since many embodiments of the invention can be made without departing from the spirit and scope of the invention, the invention resides wholly in the claims hereinafter appended.

I claim:

1. An aqueous adhesive, capable of forming substantial bonds resistant to humidity and water, and capable of rapidly debonding in the presence of strong base, which comprises an effective debonding amount of finely divided aluminum, an effective amount of a natural product bonding agent, and water.

2. The aqueous adhesive of claim 1 wherein the finely divided aluminum comprises an aluminum flake having a particle size of about 100 to 0.1 microns.

3. The adhesive of claim 1 wherein the finely divided aluminum comprises a finely divided atomized aluminum powder which is present in an amount of about 0.1 to 15 wt-% of the adhesive.

4. The adhesive of claim 3 wherein the particle size of the atomized aluminum powder is about 100–0.1 microns and is present in an amount of about 0.25 to 5 wt-% of the adhesive.

5. The adhesive of claim 3 wherein the atomized aluminum powder has a particle size of about 25 to 0.1 microns, and is present in an amount of about 1 to 3 wt-% of the adhesive.

6. The adhesive of claim 1 wherein the bonding agent comprises casein, a casein derivative or mixtures thereof.

7. The adhesive of claim 1 wherein the bonding agent comprises starch or a mixture of starches.

8. The adhesive of claim 1 wherein the natural product bonding agent comprises starch in combination with a fortifying hydrophilic polymer.

9. The adhesive of claim 8 wherein the fortifying hydrophilic polymers are a styrene-maleic anhydride copolymer, an acrylate polymer, or mixtures thereof.

10. The adhesive of claim 9 wherein the styrene maleic anhydride fortifying polymer is the ammonium derivative of a hydrolyzed maleic anhydride polymer.

11. The adhesive of claim 1 wherein the adhesive contains a nitrogenous substance comprising urea, dicyandiamide, or mixtures thereof.

12. The adhesive of claim 1 wherein the adhesive contains less than 75 wt-% water.

13. The adhesive of claim 1 wherein the adhesive contains about 10 to 60 wt-% of the natural product bonding agent.

14. The adhesive of claim 9 wherein the adhesive contains about 1 to 40 wt-% of the hydrophilic polymeric fortifying polymer.

15. The adhesive of claim 1 wherein the nitrogenous substance is present in an amount of about 0.1 to 20 wt-% based on the adhesive.

16. The adhesive of claim 10 wherein the ammonia is present in an amount of about 0.1–5 moles of ammonia per each mole of hydrophilic hydrolyzable substituent in the polymer.

17. A method for labeling containers which comprises forming a bond between a label and a container with the adhesive of claim 1.

18. A method of forming an aqueous adhesive, capable of forming substantial bonds resistant to humidity and water, and capable of rapidly debonding in the presence of strong base, which comprises forming a suspension of an effective debonding amount of finely divided aluminum and an effective amount of a natural product bonding agent in water.

19. The method of claim 18 wherein the finely divided aluminum is a finely divided aluminum flake having a particle size of about 100–0.1 microns and is present in an amount of about 0.25 to 5 wt-% of the adhesive.

20. The method of claim 18 wherein the finely divided aluminum comprises a finely divided aluminum powder which is present at a concentration of about 0.1 to 15 wt-% of the adhesive composition.

21. The method of claim 20 wherein the aluminum powder has a particle size of less than about 100–0.1 microns, and is present in an amount of about 0.25 to 5 wt-% of the adhesive.

22. The method of claim 20 wherein the atomized aluminum powder has a particle size of about 25 to 0.1 microns, and is present in an amount of 1 to 3 wt-% of the adhesive.

23. The method of claim 18 wherein the bonding agent comprises casein, a casein derivative, or mixtures thereof.

24. The method of claim 18 wherein the bonding agent comprises starch or a mixture of starches.

25. The method of claim 18 wherein the bonding agent comprises starch in combination with a hydrophilic fortifying polymer composition.

26. The method of claim 25 wherein the hydrophilic fortifying polymer composition comprises a styrene maleic anhydride polymer, an acrylate polymer or mixtures thereof.

27. The method of claim 26 wherein a styrene maleic anhydride copolymer comprises the ammonium derivatives of a hydrolyzed styrene maleic anhydride copolymer.

28. The method of claim 18 wherein there is also present in the adhesive a viscosity controlling amount of a nitrogenous substance comprising urea, dicyandiamide, or mixtures thereof.

29. The method of claim 18 wherein the bonding agent is present in the adhesive at an amount of about 10–60 wt-% based on the total composition.

30. The method of claim 25 wherein the hydrophilic fortifying polymer is present at a concentration of about 1 to 40 wt-% based on the adhesive composition.

31. The method of claim 28 wherein the nitrogenous substance is present at a concentration of about 0.1–20 wt-% based on the adhesive composition.

32. The method of claim 27 wherein the amount of ammonia present comprises about 0.1–5 moles of ammonia per each mole of maleic anhydride in the polymer.

33. An aqueous adhesive, capable of forming substantial bonds resistant to humidity and water and capable of rapidly debonding in the presence of strong base, which comprises:
(a) about 0.1 to 25 wt-% of an atomized aluminum powder having a particle size of about 0.1 to 100 microns;
(b) about 10 to 60 wt-% of starch;
(c) about 1 to 40 wt-% of a fortifying hydrophilic polymeric composition;
(d) about 0.1 to 20 wt-% of urea, dicyandiamide or mixtures thereof; and
(e) water.

34. The aqueous adhesive of claim 33 wherein the atomized aluminum has an average particle size of 0.1 to 25 microns and is present in an amount of about 1 to 3 wt-% of the adhesive.

35. The aqueous adhesive of claim 33 wherein the fortifying hydrophilic polymeric composition comprises an ammonium derivative of a hydrolyzed styrene-maleic anhydride polymer.

36. The aqueous adhesive of claim 33 wherein a defoamer and a bacteria inhibitor are also present.

37. A method for applying a label to a container which comprises the steps:
(a) forming a layer of the adhesive of claim 33 on a label; and
(b) contacting the container with the label wherein the adhesive forms a bond between the label and the container.

* * * * *